July 14, 1959 E. GASPAR ET AL 2,894,286
INJECTION MOLDING HEATING CYLINDER
Filed Feb. 20, 1957 2 Sheets-Sheet 1
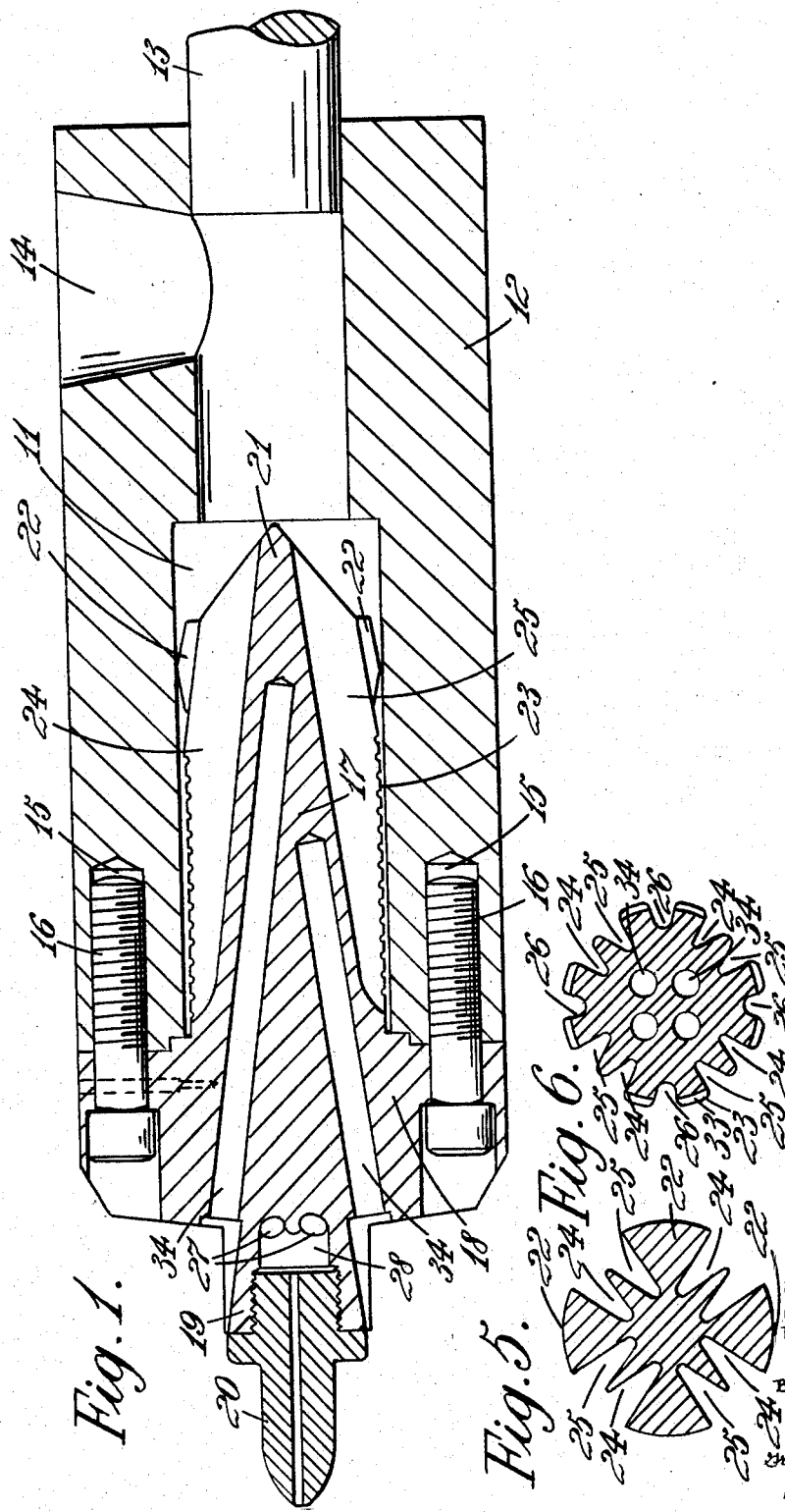

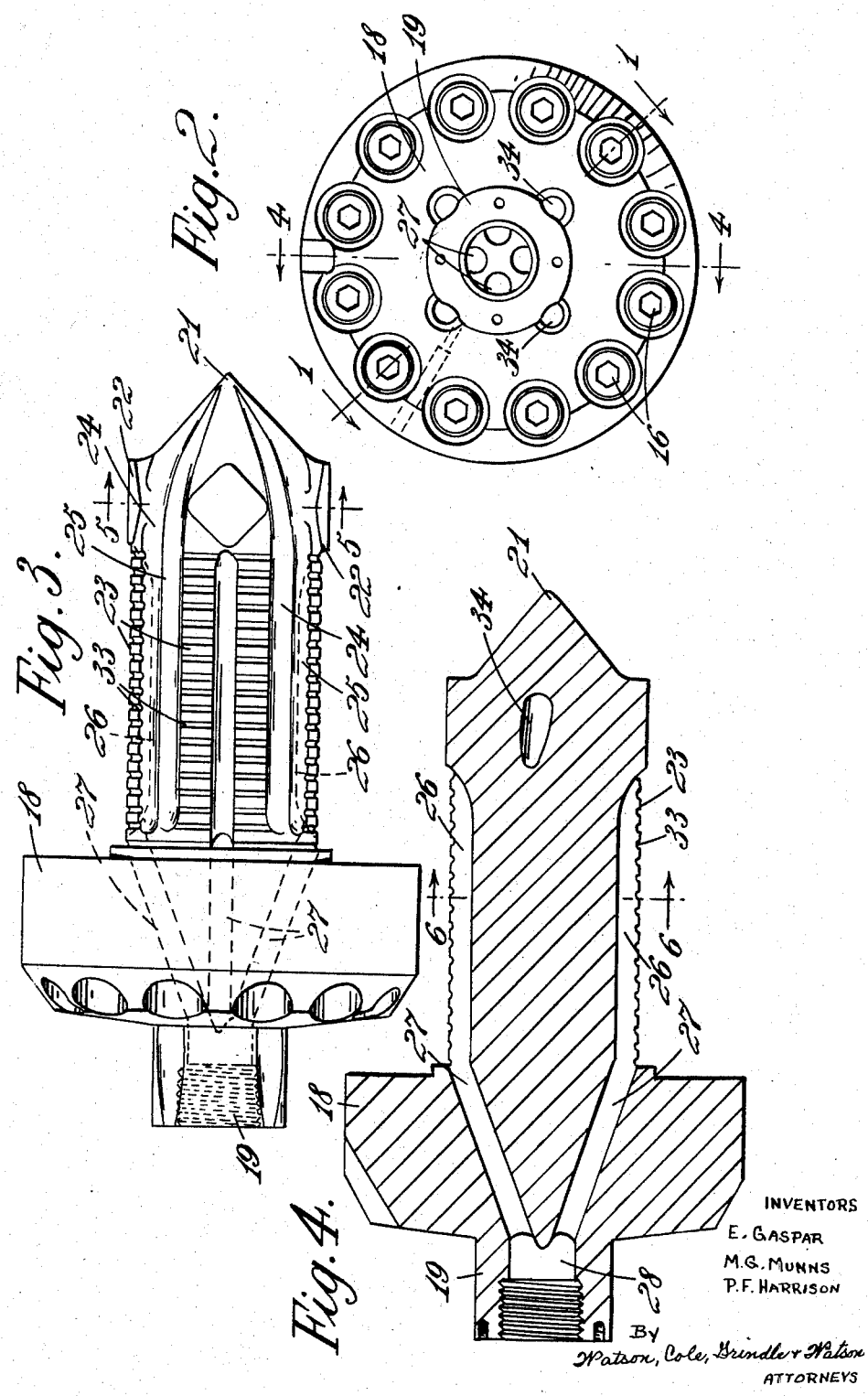

United States Patent Office 2,894,286
Patented July 14, 1959

2,894,286

INJECTION MOLDING HEATING CYLINDER

Emeric Gaspar, Michael George Munns, and Peter Franklin Harrison, London, England, assignors to The Projectile and Engineering Company Limited, London, England, a British company Application February 20, 1957, Serial No. 641,329

Claims priority, application Great Britain February 21, 1956

5 Claims. (Cl. 18—30)

This invention comprises improvements in or relating to injection moulding apparatus.

In the injection moulding of plastics the plastic material is normally fed to an injection nozzle which is in contact with the mould, through a heating chamber which is supplied with heat from the outside, usually by means of electrical heating elements around the chamber. As most plastic materials are bad conductors of heat it is common to have a torpedo-shaped spreader in the heating chamber which causes the material to be forced through an annular passage between the spreader and the outer walls of the chamber and thereby reduces the thickness of material through which heat has to be transmitted. In certain instances the spreader itself contains internal heating elements. Nevertheless, the heating of the plastic material leaves something to be desired, as in machines of high output it is frequently found that the material forced into the mould is not entirely of uniform temperature and that the plasticising of the material constitutes a limiting factor on production.

According to the present invention the spreader within the heating chamber is given a fluted conformation so that material to be plasticised may flow along the flutes and the flutes are connected to the outlet from the heating chamber through narrow spaces formed between the exterior surface of the spreader and the interior surface of the heating chamber, which spaces lead to outlet passages.

Preferably the spreader is maintained in good heat-conducting relationship with the external walls of the heating chamber. The outlet passages may themselves be constituted by intermediate flutes in the spreader. The fluted conformation of the spreader increases the heat-conducting surface in contact with the plastic material and the disposition of the flutes and narrow spaces leads to a circumferential flow of the material from the inlet flutes to the outlet passages; these two factors greatly assist in promotion of uniform heat absorption by all portions of the material fed through the chamber.

The following is a description by way of example of one construction in accordance with the invention, with reference to the accompanying drawings, in which:

Figure 1 is a longitudinal section through a heating chamber and spreader in accordance with the invention, the section being taken in a plane indicated by line 1—1 of Figure 2;

Figure 2 is an end view, looking from the left in Figure 1;

Figure 3 is a side elevation of the spreader by itself;

Figure 4 is a longitudinal section on line 4—4 of Figure 2;

Figure 5 is a section on line 5—5 of Figure 3; and

Figure 6 is a section on line 6—6 of Figure 4.

Referring to Figure 1, a heating chamber 11 is provided which is formed in one piece with a plunger barrel 12 projecting from it at the back end. In the barrel 12 works a plunger 13 which serves to feed plastic material through the chamber, and the upper side of the barrel is provided with a port 14 through which granular plastic material can drop (from a hopper not shown) when the plunger 13 is withdrawn past the port 14. The granular plastic material is forced forward when the plunger 13 is caused to advance (to the left as viewed in Figure 1) and when the plunger has closed the port 14 by passing beyond it, the plunger is able to exert high pressure on the plastic material to force it through the heating chamber 11.

The heating chamber 11 is a cylindrical chamber somewhat larger in diameter than the plunger barrel and at the end remote from the barrel the walls of the chamber, which are very stout, are drilled with a ring of threaded holes 15 parallel to the axis of the chamber to receive fixing screws 16. A spreader 17 is provided which projects longitudinally into the chamber 11. At the outlet end of the chamber the spreader has a large stout flange or head 18, the external diameter of which is equal to the external diameter of the chamber and which is held in place against the chamber by the screws 16 passing into the aforesaid ring of drilled and threaded holes 15. The head 18 of the spreader furthermore carries a boss 19 which projects away from the heating chamber and into which there is screwed an injection nozzle 20.

The end 21 of the spreader which projects toward the plunger 13 is pointed and around the thick base of the point there are four bosses 22 which fit the interior of the heating chamber closely. Between the bosses 22 and the head 18 of the spreader it has a cylindrical main outer surface 23 which is a little smaller in diameter than the interior of the heating chamber so as to leave a narrow annular space. Between each of the bosses there are machined in the surface of the spreader a pair of grooves 24, 25 which extend longitudinally along the spreader for nearly its whole length within the heating chamber. Each of the four pairs of grooves 24, 25 begins by the pointed end 21 of the spreader between the bosses 22 aforesaid with a considerable depth, the bottoms of the grooves running smoothly into the tapered point of the spreader at this end and the grooves becoming progressively shallower towards the head end of the spreader so that they vanish altogether just before reaching the head 18.

The surface of the spreader between the bosses 22 and the head is grooved with single grooves 26 which begin at the boss end and extend toward the head end 18 of the spreader. These four grooves 26 extend in the opposite direction from the pairs of grooves 24, 25 between which they lie and the four grooves 26 constitute outlet grooves. At the head 18 they open into four passages 27 which extend through the head at an inclination to the axis of the heating chamber and meet one another in a little chamber 28 lying immediately at the base of the outlet nozzle 20.

The effect of this construction is that when plastic material is forced forward into and through the heating chamber by the plunger, the plastic material is first forced into the deep ends of the pairs of grooves 24, 25 between the bosses 22 on the spreader. The spreader itself is maintained at an elevated temperature at this end by heat conduction from the heated walls of the chamber with which the bosses are in contact and the plastic material becomes softened partly by conduction from the walls of the pairs of grooves and partly by conduction from the directly heated walls of the chamber itself. As the plastic material becomes softer and is forced further up the grooves 24, 25 which become gradually shallower, more and more of it is forced to spill over sideways, that is to say in a circumferential direction, through the narrow annular space between the spreader surface 23 and the walls of the chamber 11 into the outlet grooves 26. It flows down the outlet grooves 26 receiving further plastic material as it goes and ultimately the input is wholly driven out of the inlet grooves 24, 25 into the outlet grooves 26 and thence through the converging passages 27 to the nozzle 20. The way in which the flowing plastic material is split and then reunited results in an advantageous form of flow and a uniform temperature of the material at the nozzle.

The cylindrical surface 23 of the spreader is preferably broken up by circumferential grooves 33 which make the flow of the plastic material easier and increase the area of surface-contact of the spreader therewith.

The interior of the spreader is drilled with four inclined holes 34 which enter it from close around the external boss 19 which supports the injection nozzle. The holes 34 become closer together toward the point 21 of the spreader and are of varying depth, as seen in Figure 1 so that only one of them reaches the centre line near point 21 and they do not break into one another. These holes serve to accommodate electrical heating units, which assist in keeping the spreader hot and in producing a uniform plasticised throughput.

We claim:

1. In a heating chamber for extrusion or moulding of plastics the provision of a spreader which has an external fluted conformation so that material to be plasticised may flow along the flutes, and wherein the flutes are connected to the outlet from the heating chamber through narrow circumferentially extending spaces formed between the exterior surface of the spreader and the interior surface of the heating chamber and to longitudinally extending outlet passages into which the circumferentially extending passages open.

2. A heating chamber as claimed in claim 1, wherein the outlet passages are constituted by intermediate flutes in the spreader and by passages through the outlet end of the spreader with which said flutes communicate.

3. A heating chamber comprising in combination a thick-walled cylindrical chamber, an inlet at one end, securing means at the other end for a spreader, and a spreader which enters the chamber and is held by said securing means, said spreader having external flutes commencing at or near the end of the spreader nearest the inlet and extending longitudinally but terminating before the other end of the heating chamber, an outlet chamber formed in the spreader outside the heating chamber, intermediate flutes extending along the spreader between the external flutes aforesaid, which intermediate flutes communicate with said outlet chamber, and a narrow space between the exterior of the spreader and the interior of the walls of the heating chamber through which space plastic material entering said first-mentioned flutes can spill over laterally therefrom to the intermediate flutes which communicate with the outlet.

4. A heating chamber as claimed in claim 3, wherein the interior of the spreader is provided with electric heating elements.

5. A heating chamber as claimed in claim 3, wherein the exterior of the spreader in said narrow space is circumferentially grooved.

References Cited in the file of this patent
UNITED STATES PATENTS

| | | |
|---|---|---|
| 2,462,308 | Dinzl | Feb. 22, 1949 |
| 2,480,838 | Caron | Sept. 6, 1949 |